United States Patent [19]
Lamb

[11] Patent Number: 5,712,520
[45] Date of Patent: Jan. 27, 1998

[54] PERMANENT MAGNET BRAKING SYSTEM

[75] Inventor: Karl J. Lamb, Port Angeles, Wash.

[73] Assignee: Magna Force, Inc., Port Angeles, Wash.

[21] Appl. No.: 617,314

[22] Filed: Mar. 18, 1996

Related U.S. Application Data

[63] Continuation-in-part of Ser. No. 546,066, Oct. 20, 1995, Pat. No. 5,668,424, which is a continuation of Ser. No. 237,031, May 3, 1994, Pat. No. 5,477,094, which is a continuation-in-part of Ser. No. 65,867, May 21, 1993, Pat. No. 5,477,093.

[51] Int. Cl.$^6$ .............................. H02K 1/00; H02K 3/00
[52] U.S. Cl. .......................... 310/92; 310/75 D; 310/77; 310/78; 310/75 R; 310/76; 310/102 A
[58] Field of Search .............................. 310/92, 77, 75 D

[56] References Cited

U.S. PATENT DOCUMENTS

| | | | |
|---|---|---|---|
| 4,152,617 | 5/1979 | Janson | 310/103 |
| 4,788,463 | 11/1988 | Layh | 310/77 |
| 4,896,754 | 1/1990 | Carlson et al. | 192/21.5 |
| 5,107,156 | 4/1992 | Jaun et al. | 310/162 |
| 5,154,623 | 10/1992 | Kuwahara | 188/164 |
| 5,215,169 | 6/1993 | Kuwahara | 188/164 |
| 5,227,702 | 7/1993 | Nahirney | 318/138 |
| 5,238,095 | 8/1993 | Pedu | 192/84 R |
| 5,294,071 | 3/1994 | Hartel et al. | 242/150 M |

*Primary Examiner*—Clayton E. LaBalle
*Assistant Examiner*—Elvin G. Elvad
*Attorney, Agent, or Firm*—Seed and Berry LLP

[57] ABSTRACT

A conductor rotor presents a pair of electroconductive rings spaced apart to receive magnet carrying shoes with permanent magnets to induce eddy currents in the rings and thereby retard rotation of the conductor rotor. The shoes are moved in and out in a controlled manner to move between a retracted brake-off position and an extended brake-on position.

10 Claims, 2 Drawing Sheets

PERMANENT MAGNET BRAKING SYSTEM

CROSS-REFERENCE

This application is a continuation-in-part of my copending application Ser. No. 08/546,066, filed Oct. 20, 1995, which is a continuation of the application Ser. No. 237,031 filed may 3, 1994 issued as U.S. Pat. No. 5,477,094 issued Dec. 19, 1995, which is a continuation-in-part of the application Ser. No. 065,867 filed May 21, 1993 issued as U.S. Pat. No. 5,477,093 issued Dec. 19, 1995.

TECHNICAL FIELD

This invention relates to braking systems for braking one of the rotors in a permanent magnet drive system of the general type shown in my U.S. Pat. No. 5,447,094.

BACKGROUND OF THE INVENTION

In my U.S. Pat. No. 5,473,209 there is disclosed a permanent magnet braking system for a shaft having a magnet rotor thereon which co-acts with one or two non-rotary electro-conductive members which can be adjusted in a direction axially of the shaft to vary the air gap between the magnet rotor and the electro-conductive member(s). When the air gap is narrowed a braking effect occurs.

A need has arisen for an alternative permanent magnet braking system which does not operate by varying the width of the air gap.

SUMMARY OF THE INVENTION

The brake of the present invention operates in conjunction with a conductor rotor having a pair of electroconductive rings spaced apart axially of the rotor. The brake presents a pair of non-rotary magnet carrying shoes each extending laterally from a respective laterally movable beam which is parallel to the rotary axis of the conductor rotor. Outward movement of the beams from a retracted inactive position places sets of permanent magnets on the shoes between a pair of the electroconductive rings and spaced therefrom by air gaps. As a result the magnetic flux emanating from the magnets is intersected by the rotating electroconductive rings and eddy currents are created therein. Consequently the rotational speed of the conductor rotor is retarded. The amount of retardation can be varied by varying the amount of overlap of the magnets by the electroconductive rings, and namely by varying the outward extension of the magnet carrying shoes by the beams as by pneumatic cylinders.

DETAILED DESCRIPTION OF THE INVENTION

Figure 1:
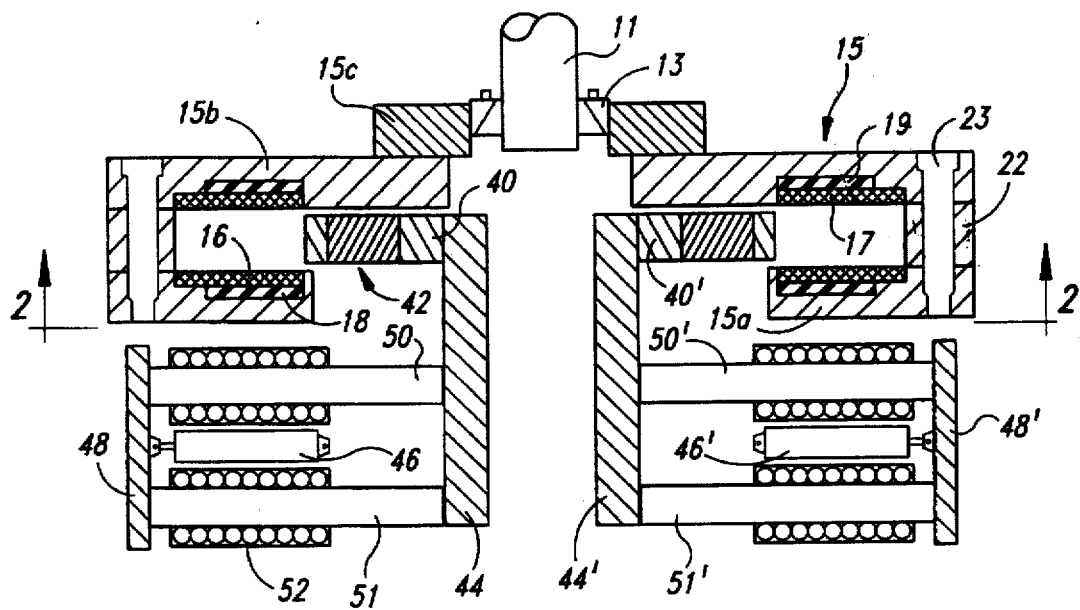
FIG. 1 is a longitudinal horizontal sectional view of a braking system embodying the invention and with the brake being shown in an "off" position.

Referring to the drawings, shaft 11 is connected by coupling 13 to a magnet rotor unit 14 and conductor rotor unit 15. The conductor rotor unit presents two axially spaced flat rings (continuous bands) 16–17 having good electroconductive characteristics such, for example, as copper or aluminum. These rings 16–17 have ferrous backing rings 18–19, preferably of mild steel. The ferrous backing 18–19 for the electroconductive rings 16–17, and the electroconductive rings 16–17, are mounted on a support ring 15a and a support plate 15b having a hub 15c receiving the coupling 13. Spacers in the form of sleeves 22 separate the members 15a–15b and they are held by bolts 23 passing through the sleeves and the members 15a–15b.

The support members 15a–15b are formed with like annular recesses of a thickness to receive respective of the backing rings 18–19 and electroconductive rings 16–17 in stacked relation. It is preferred to have the mouth of the recesses countersunk with a pattern of indentations matching lobes 24 provided on an expanded outer border portion of the electroconductive rings 16–17 which extends beyond the outer marginal edge of the backing 18–19. Mounting screws extend through holes 24a in the lobes 24 into the support members 15a–15b.

Acting in concert with the conductor rotor 15 is a pair of magnet shoes 40—40'. The shoe 40 has, for example, three magnet sets 42 mounted in rectangular through openings 43 in the shoe. Each magnet set 42 has a pair of permanent magnets 42a, 42b arranged with their polarities reversed relative to one another.

The shoes 40–40' are mounted on beams 44–44' which are parallel to and diametrically opposite from the rotary axis of the shaft 11. The beams 44–44' are selectively moved toward and away from the rotary axis by operation of pneumatic cylinders 46–46' acting against respective cross-members 48–48' each of which interconnects a respective pair of guide rods 50–51 and 50'–51'. These guide rods extend through linear bearings 52 mounted together with the inner end of the cylinders 46–46' on a suitable rigid frame (not shown).

Figure 3:
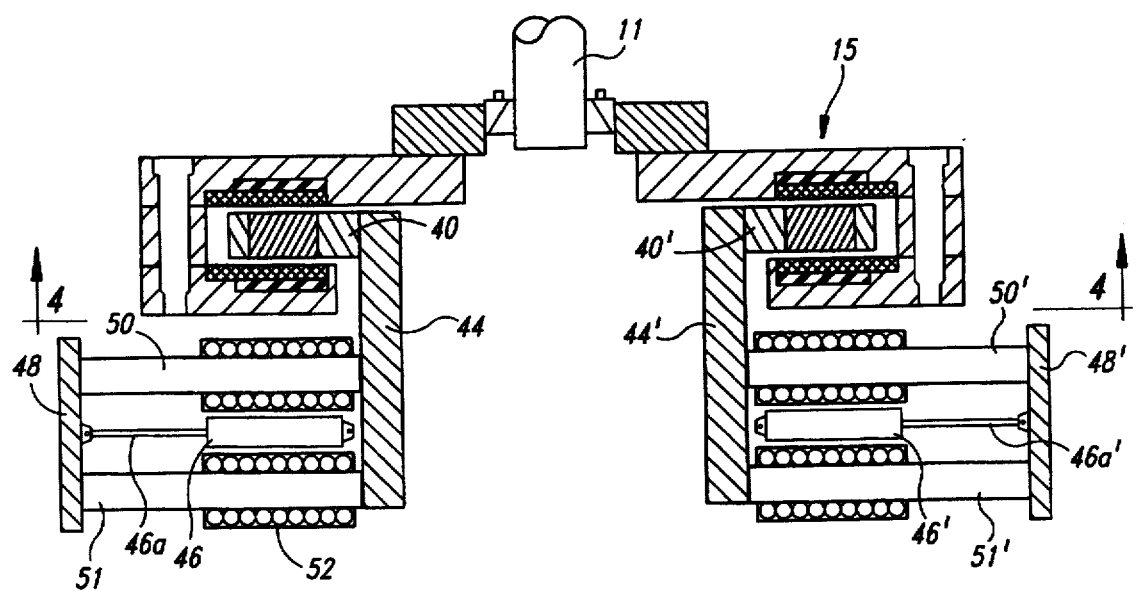
FIG. 3 is a sectional view corresponding to FIG. 1, but with the brake being shown in a fully "on" position.
Figure 4:
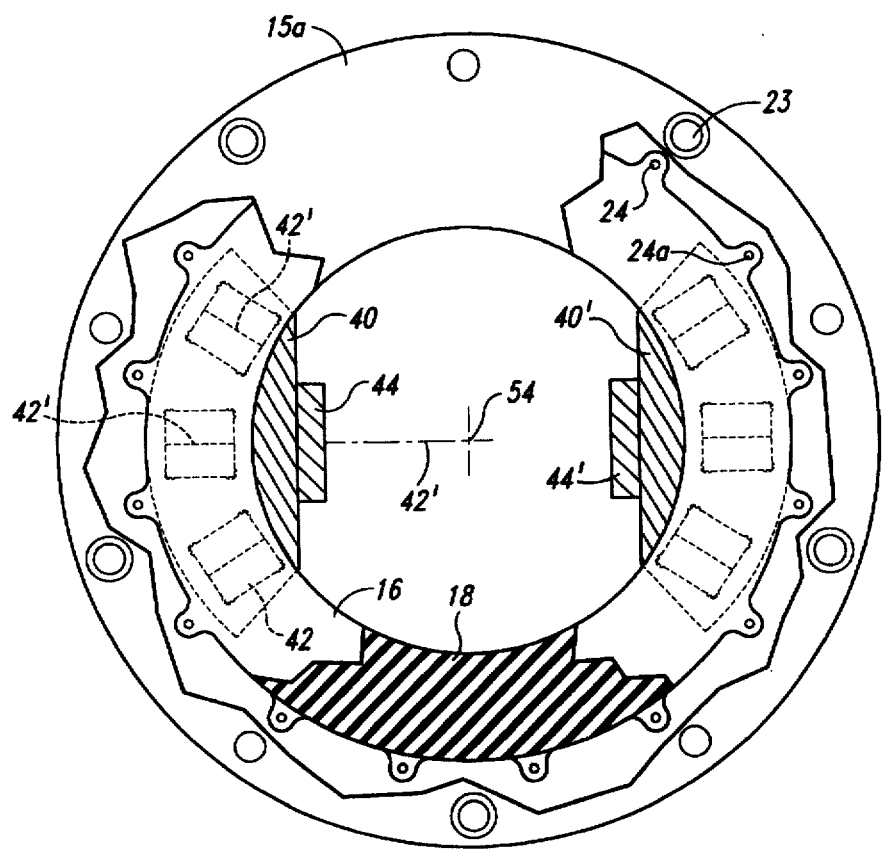
FIG. 4 is a transverse sectional view taken as indicated by line 4—4 in FIG. 3 and with parts broken away.

Referring to FIG. 4 it is seen that the magnet sets 42 in each shoe 40–40' are arranged in an arc which corresponds to the curvature of the electroconductive rings 16–17. When the shoes are extended to a fully "on" condition of the brake (FIGS. 3–4), the longitudinal side faces of the magnets in each set 42 which face one another define a neutral plane 42' therebetween which extends radially from the rotary axis 54 of the shaft 11 for maximum performance of the magnets.

Figure 2:
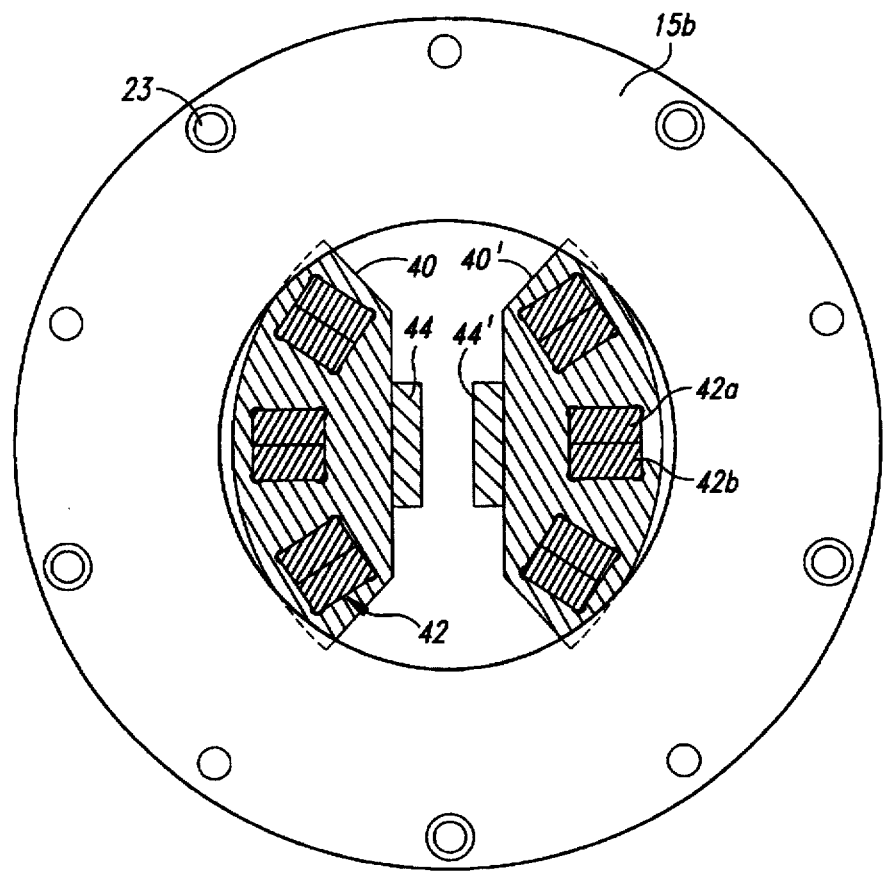
FIG. 2 is a transverse sectional view taken as indicated by line 2—2 in FIG. 1.

When the cylinders 46–46' are in a retracted condition the magnet carrying shoes 40–40' are retracted toward one another to an "off" position where the magnet sets 42 are withdrawn from between the electroconductive rings 16–17 (FIGS. 1–2). When the brake is to be applied the cylinders 46–46' are energized to extend the cylinder rods 46a–46a' and push the cross-members 48–48' outwardly. Control of the cylinders 46–46' can be performed by a control system coupled to a suitable compressed air supply as well known in the pneumatic control art and as shown, for example, in U.S. Pat. No. 5,473,209. When the cross-members 48–48' move outwardly the pairs of guide rods 50–51 and 50'–51' are pulled outwardly through the linear bearings 52, thereby moving the beams 44–44' and shoes 40–40' outwardly so that the sets of magnets 42 move between the rotating electroconductive rings 16–17. As this movement occurs, eddy currents are induced in the rings 16–17 by the magnetic fields of the magnets. As a consequence rotation of the conductor 15 is progressively retarded with outward advancement of the shoes 40–40' increasing exposure of the magnet sets 42 to the rings 16–17.

It will be understood that the conductor rotor 16 may have an additional pair of electroconductive rings mounted on the outer side of the mounting ring 18 and an additional mounting ring spaced therefrom by additional spacers 22 and carried on longer tie bolts 23. When that is done additional magnet carrying shoes can be mounted on the beams 44-44' to interact with the additional pair of electroconductive rings.

The parts 15a, 22, 15b and 15c of the conductor rotor 15, and the shoes 40-40' and beams 44-44' are preferably made of a suitable aluminum alloy.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A braking system comprising:

a rotary shaft having a rotary axis;

a conductor rotor mounted on said shaft and having two axially spaced non-ferrous electroconductive rings facing one another and backed by magnetic material;

a stationary support;

a non-rotating braking shoe moveably mounted on said support and containing permanent magnets each with its poles facing in opposite directions parallel to said axis; and an operating mechanism connected to said shoe for selectively moving said shoe in a plane perpendicular to said axis in which said magnets are not between said rings and a brake-on position between said rings in which said shoe is spaced by air gaps from said rings for inducing eddy currents in the rings by way of magnetic flux from said magnets bridging said air gaps when the conductor rotor is rotating.

2. A braking system according to claim 1 in which there are a pair of said shoes positioned diametrically opposite one another relative to said axis.

3. A braking system according to claim 1 in which said shoe has multiple magnets occupying an arc corresponding generally to the curvature of said rings.

4. A braking system according to claim 1 in which said shoe is mounted on a member which is parallel to said axis and is spaced inwardly toward said axis from one of said rings, said mechanism including a device on said support connected to said member and adapted to selectively move said member outwardly toward said rings and inwardly toward said axis.

5. A braking system according to claim 1 in which the movement of said shoe between brake-off and brake-on positions is along a linear path perpendicular to said axis.

6. A braking system according to claim 1 in which said rings are backed with mild steel bands and are mounted in aluminum members.

7. A braking system according to claim 4 in which said member is rigidly mounted on a pair of guide rods slideably mounted in stationary bearings on said support.

8. A braking system according to claim 1 in which said rings have planar faces at said air gaps which occupy planes perpendicular to said axis.

9. A braking system according to claim 4 in which said member extends between said one ring and said axis to said device in parallel relation to said axis, said device being spaced from said conductor rotor and shaft in a direction endwise of said shaft.

10. A braking system according to claim 1 in which there is an annular space between one of said rings and said axis through which said mechanism extends from said support to make connection to said shoe.

* * * * *